United States Patent [19]

Smedberg et al.

[11] Patent Number: 4,825,681

[45] Date of Patent: May 2, 1989

[54] PNEUMATIC PRESS COUNTERBALANCE AND CUSHION CONSTRUCTION

[75] Inventors: Kenneth L. Smedberg, 5 Oak Hill Dr., Crete, Ill. 60417; George J. Bozich, Chicago; Robert J. Kotynski, South Holland, both of Ill.

[73] Assignee: Kenneth L. Smedberg, Crete, Ill.

[21] Appl. No.: 6,732

[22] Filed: Jan. 22, 1987

[51] Int. Cl.$^4$ .............................................. B21D 24/02
[52] U.S. Cl. .................... 72/453.13; 72/344; 267/119; 267/122; 267/130; 100/259
[58] Field of Search ............ 267/122, 119, 130, 64.19, 267/64.20, 64.25, 64.24, 64.27, 64.29; 72/350, 344, 453.13, 465, 349, 456, 455, 347; 100/214, 259, 267

[56] References Cited

U.S. PATENT DOCUMENTS

| | | |
|---|---|---|
| 1,970,134 | 8/1934 | Ferris . |
| 2,084,066 | 6/1937 | Rode et al. . |
| 2,483,597 | 10/1949 | Schogren . |
| 2,773,686 | 12/1956 | Nash .................... 267/64.23 |
| 2,827,283 | 3/1958 | Browne et al. . |
| 2,887,069 | 5/1959 | Lich .................... 267/64.23 |
| 2,902,291 | 9/1959 | Walker . |
| 2,999,682 | 9/1961 | Stump .................... 267/65 |
| 3,115,676 | 12/1963 | Quartullo .................... 18/16 |
| 3,130,962 | 4/1964 | Stegner .................... 267/119 |
| 3,130,963 | 4/1964 | Stegner .................... 267/119 |
| 3,776,020 | 12/1973 | Fedosenko et al. .................... 72/445 |
| 3,834,216 | 9/1974 | Schiller et al. .................... 72/441 |
| 3,914,975 | 10/1975 | Kawano .................... 72/389 |
| 4,148,209 | 4/1979 | Bessho .................... 72/441 |
| 4,291,571 | 9/1981 | Claussen .................... 72/453.18 |
| 4,674,911 | 6/1987 | Gertz .................... 267/122 |

FOREIGN PATENT DOCUMENTS

| | | |
|---|---|---|
| 1294334 | 5/1969 | Fed. Rep. of Germany . |
| 0131850 | 10/1981 | Japan .................... 267/122 |
| 0137636 | 8/1984 | Japan .................... 267/122 |
| 0338034 | 9/1981 | U.S.S.R. . |
| 1031617 | 7/1983 | U.S.S.R. . |

Primary Examiner—David Jones
Attorney, Agent, or Firm—Anthony S. Zummer

[57] ABSTRACT

The present invention relates to a pneumatic press counterbalance and cushion construction. The press counterbalance holds certain parts of a press in the same relative engagement during the return stroke of a ram of the press as during the power stroke of that ram. The counterbalance includes a fixed plate adapted for connection to a part of the press. A pneumatic bellows has one end connected to the fixed plate. A movable plate is connected to the opposite end of the pneumatic bellows. A connector rod is connected to the movable plate and to another part of the press which part is movable relative to the part to which the fixed plate is connected. The pneumatic cushion includes a resilient bellows having one end connected to the fixed plate. A bellows connector is connected to the other end of the bellows. A second bellows has one end connected to the bellows and the other end connected to the movable plate.

30 Claims, 5 Drawing Sheets

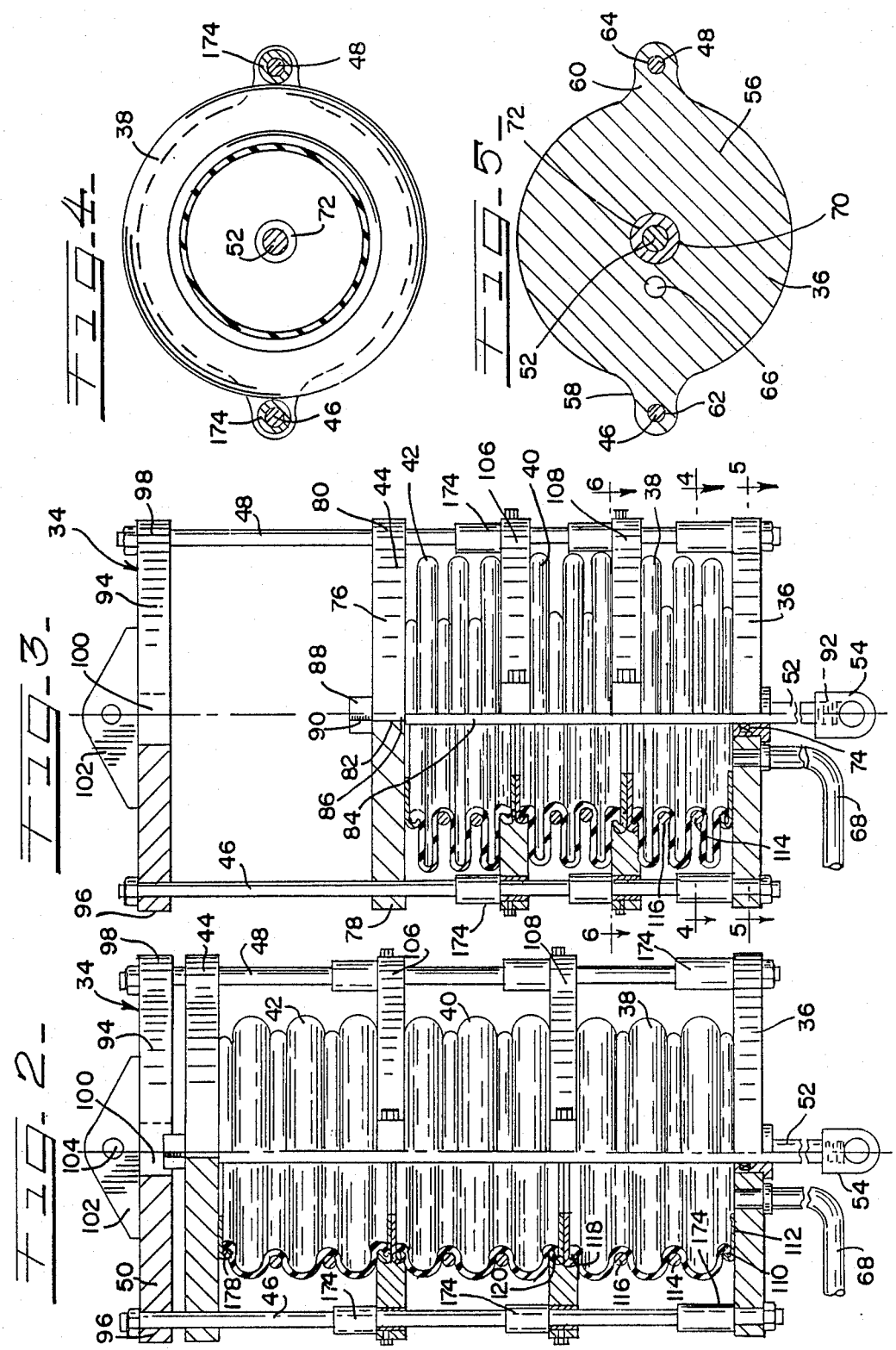

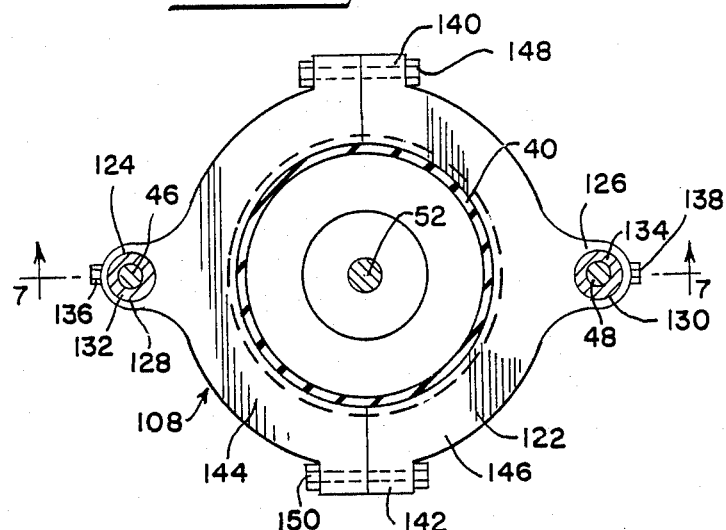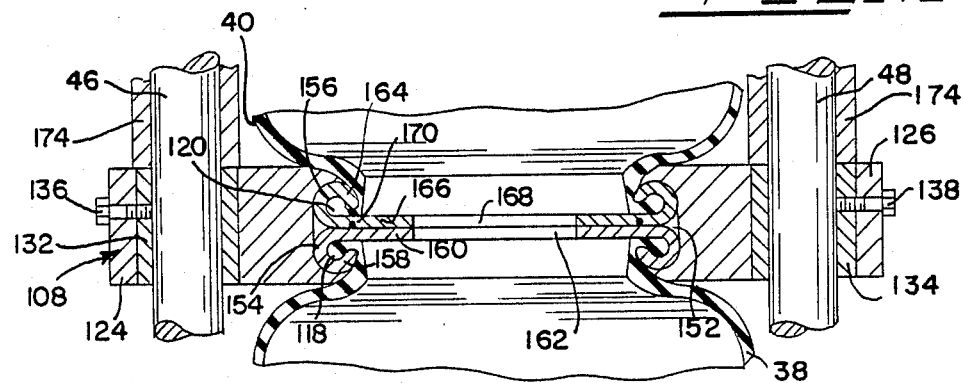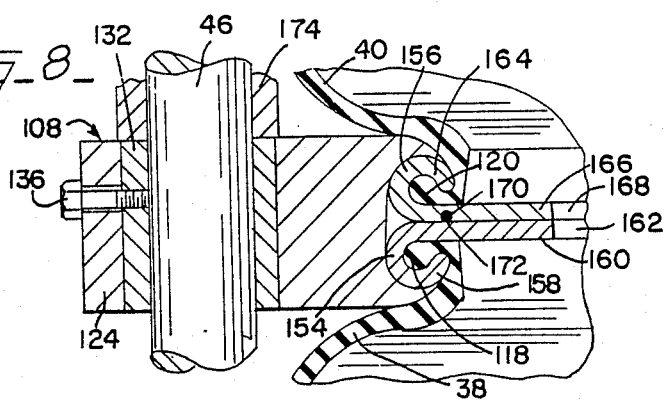

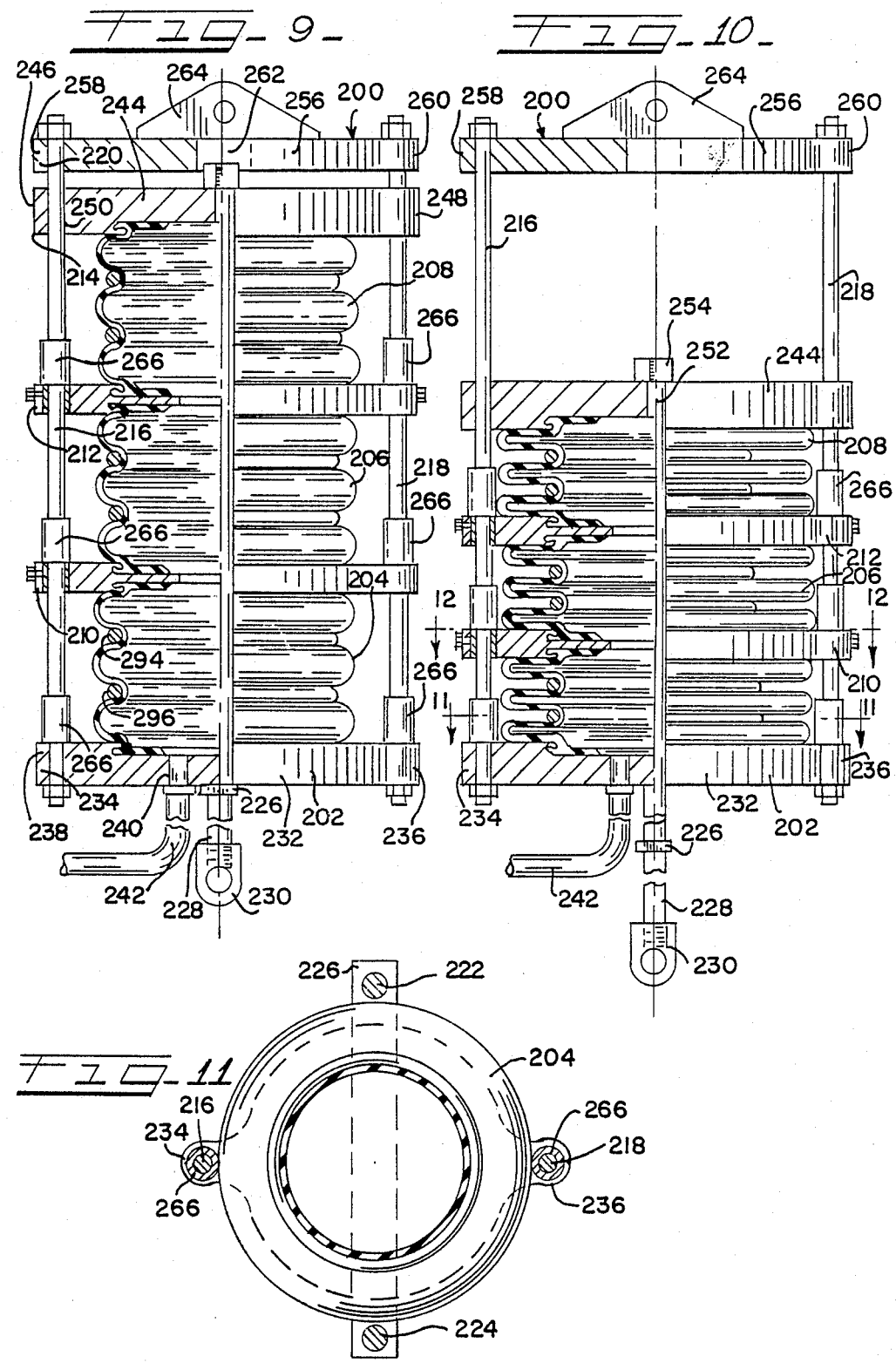

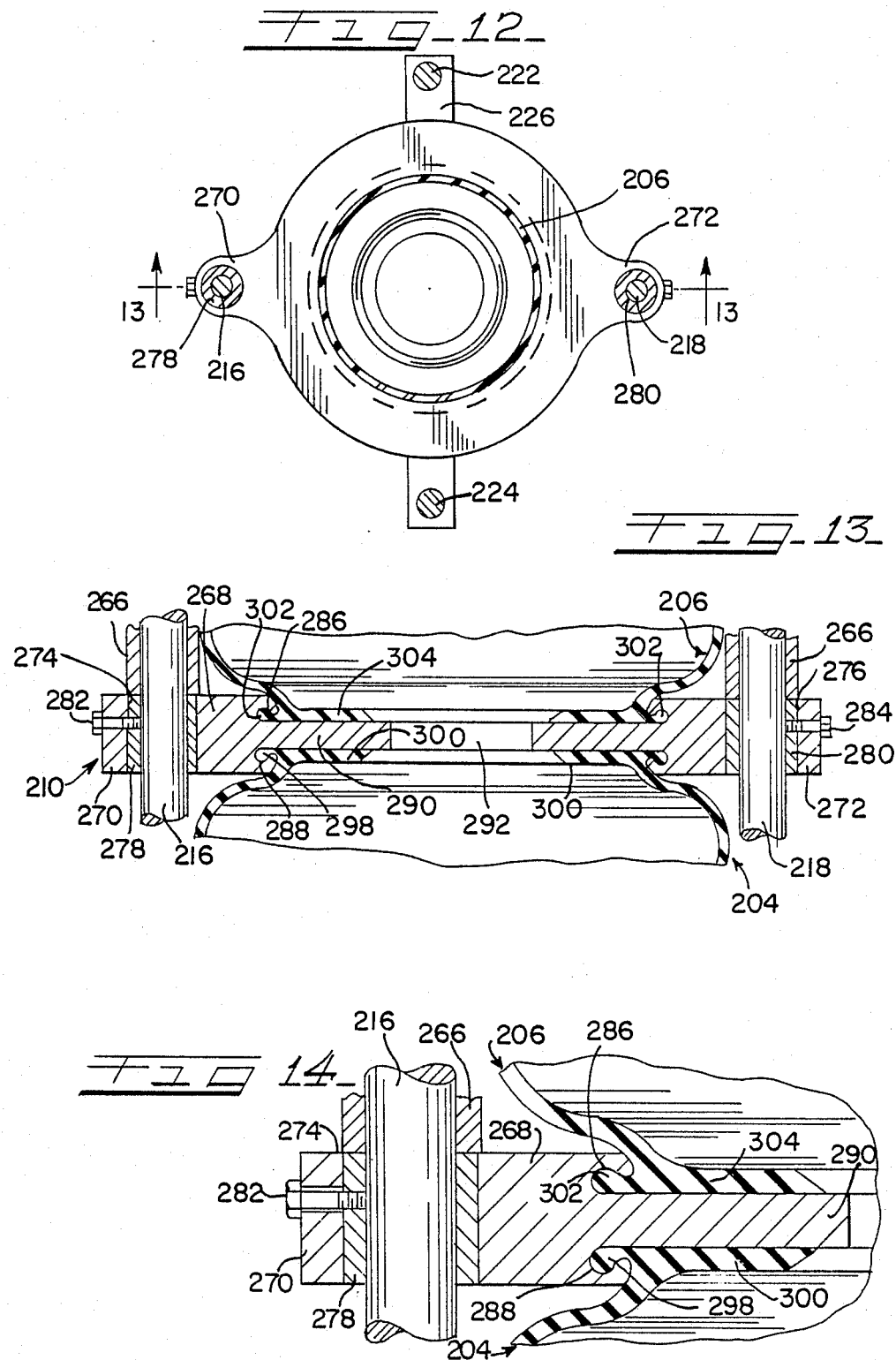

PNEUMATIC PRESS COUNTERBALANCE AND CUSHION CONSTRUCTION

BACKGROUND OF THE INVENTION

The present invention relates to a counterbalance for use on a press and an improved cushion construction. In certain press operations, it is desirable to provide a counterbalance on a press. A typical construction for such a counterbalance is disclosed in U.S. Pat. No. 2,084,066, issued June 15, 1937, to F. J. Rode et al., entitled, "Metalworking Press". The Rode metalworking press utilizes a pneumatic cylinder embodying piston rods connected to pistons within cylinders to act as counterbalancing devices. The use of various additional systems for counterbalancing various presses is shown in the following patents: U.S. Pat. No. 1,970,134, issued Aug. 14, 1934, to W. Ferris, entitled, "Hydraulic Press"; U.S. Pat. No. 2,483,597, issued Oct. 4, 1949, to C. E. Schogren, entitled, "Supplemental Forging Press Die"; U.S. Pat. No. 3,115,676, issued Dec. 31, 1963, to O. F. Quartullo entitled, "High Speed Forging Apparatus"; U.S. Pat. No. 3,776,020, issued Dec. 4, 1973, to Fedosenko et al., entitled, "High-Speed Pressing Machine"; U.S. Pat. No. 3,834,216, issued Sep. 10, 1974, to Schiller et al., entitled, "Forging Press"; U.S. Pat. No. 3,914,975, issued Oct. 28, 1975, to Kawano, entitled, "Hydraulic Press Brake"; U.S. Pat. No. 4,148,209, issued Apr. 10, 1979, to Bessho, entitled, "Forging Press"; and U.S. Pat. No. 4,291,571, issued Sep. 29, 1981, to Claussen, entitled, "Forging Press". In addition, West German Auslegeschrift No. 1 294 334, published May 8, 1969, discloses a cylinder construction for use with a press, as does USSR Publications Nos. 338034 and 1031617, of Sep. 15, 1981 and July 30, 1983, respectively.

In those prior art devices wherein pneumatic cylinders are used, there is generally air leakage in the cylinder which requires air to be replenished to the cylinder, thereby increasing the operating costs of the press.

Stacking of the resilient bellows is well known and accepted in the transportion industry. U.S. Pat. No. 2,773,686, issued Dec. 11, 1956, to C. B. Nash, entitled "Air Spring" discloses a construction wherein two bellows are interconnected. The Nash connector utilizes a conventional construction. The conventional construction for bellows of this type is also shown in the following patents: U.S. Pat. No. 2,827,283, issued Mar. 18, 1958, to K. A. Browne et al., entitled, "Air Spring With Damping Valve"; U.S. Pat. No. 2,887,069, issued May 19, 1959, to R. L. Lich, entitled, "Air Spring Railway Truck"; U.S. Pat. No. 2,902,291, issued Sep. 1, 1959, to L. B. Walker, entitled, "Vehicle Pneumatic Suspension System"; and U.S. Pat. No. 2,999,682, issued Sep. 12, 1961, to E. Stump, entitled, "Pneumatic Spring System For Motor Vehicles". The means for connecting the bellows to another portion requires the utilization of a plurality of bolts, which in many instances, are difficult to install and provide an opportunity to allow air to leak.

It is an object of the instant invention to provide an improved counterbalance construction and a cushion which reduces air loss to a minimum.

It is a further object of the present invention to provide a pneumatic counterbalance and a cushion which may be readily and easily installed.

SUMMARY OF THE INVENTION

The herein disclosed invention relates to a pneumatic press counterbalance and an improved cushion construction. The counterbalance holds certain parts of a press in the same relative engagement during the return stroke of a ram of the press as during the power stroke of that ram. The cushion construction is an improved construction having a fixed plate which fixed plate may be attached to one part of a power press. A first resilient pneumatic bellows having opposed open ends has one end sealingly connected to the fixed plate. A bellows connector having a ring body is sealingly connected to the other end of the bellows. A second resilient pneumatic bellows having opposed open ends has one end sealingly connected to the bellows connector. A movable sealing plate is sealingly connected to the other end of the second resilient bellows. The movable plate is connected to a connector rod which in turn is connected to another part of the press. The other part of the press is movable relative to the part to which the fixed plate is adapted for connection. Movement of the movable plate toward the fixed plate compresses air within the resilient pneumatic bellows. When the movable plate moves away from the fixed plate, the air compressed in the bellows urges the movable plate away from the fixed plate to hold certain parts of the press in the same relative engagement as during the movement of the movable plate toward the fixed plate.

BRIEF DESCRIPTION OF THE DRAWINGS

FIG. 2 is a side elevational view of one of the counterbalances shown in FIG. 1 but with a portion broken away in order to show the interior construction thereof, and the counterbalance shown in an expanded attitude;

FIG. 3 is a side elevational view similar to FIG. 2 but showing the pneumatic counterbalance in a substantially compressed attitude;

FIG. 4 is a cross sectional view taken on Line 4—4 of FIG. 3;

FIG. 5 is a cross sectional view taken on Line 5—5 of FIG. 3;

FIG. 6 is an enlarged cross sectional view taken on Line 6—6 of FIG. 3;

FIG. 7 is an enlarged cross sectional view taken on Line 7—7 of FIG. 6;

FIG. 8 is an enlarged fragmentary view of a portion of the counterbalance shown in FIG. 7;

FIG. 9 is a side elevational view of a second form of the pneumatic counterbalance disclosed herein with a portion of the counterbalance broken away in order to show the interior construction of the counterbalance, and the counterbalance shown in an expanded attitude;

FIG. 10 is a side elevational view similar to FIG. 9 but showing the pneumatic counterbalance of FIG. 9 in a partially compressed attitude;

FIG. 11 is a cross sectional view taken on Line 11—11 of FIG. 10;

FIG. 12 is a cross sectional view taken on Line 12—12 of FIG. 10;

FIG. 13 is an enlarged fragmentary cross sectional view taken on Line 13—13 of FIG. 12; and FIG. 14 is an enlarged fragmentary portion of the counterbalance shown in FIG. 13.

DESCRIPTION OF THE PREFERRED EMBODIMEMT

Figure 1:
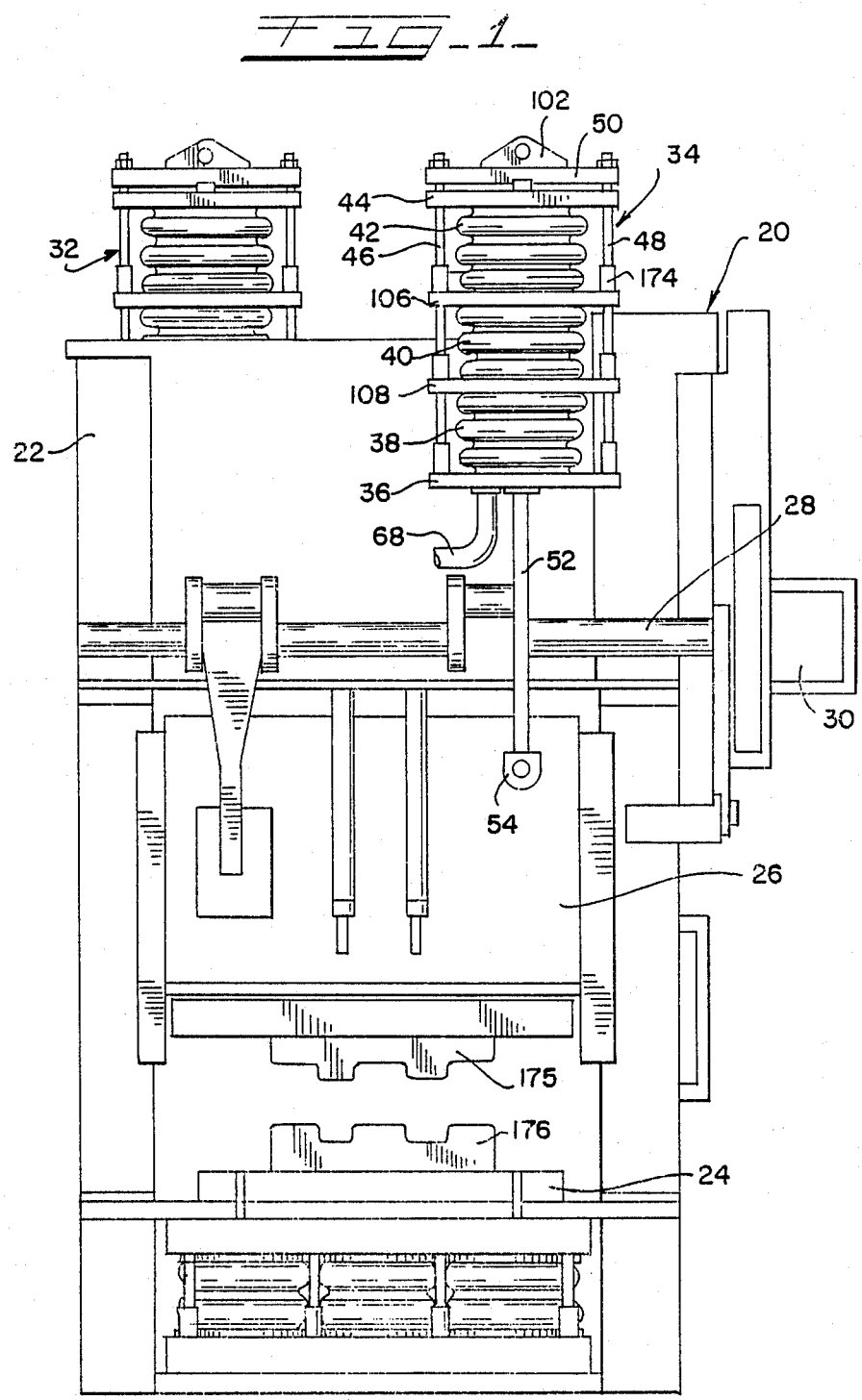
FIG. 1 is a side elevational view of a conventional power press having a pair of pneumatic counterbalances mounted thereon, which counterbalances are built in accordance with the instant invention.

Referring now to the drawings and especially to FIG. 1, a power press generally indicated by numeral 20 is shown therein. Power press 20 is conventional in its construction in that it includes a conventional frame 22 with a conventional bed 24 mounted within the frame. A conventional ram 26 is movably mounted within the frame and is operated by a conventional crank shaft 28 which is in turn driven by a conventional motor 30. A pair of identical pneumatic counterbalances 32 and 34 is mounted on the frame. Each of the counterbalances has a portion which is fixed relative to frame 22 and a portion which is connected to ram 26.

Looking now to FIGS. 2 through 8, the specific construction of counterbalance 34 is shown therein. Counterbalance 34 discloses a specific improved cushion construction. Counterbalance 34 generally includes a fixed plate 36 which is fixed to frame 22 of the power press. Three identical resilient pneumatic bellows 38, 40, and 42 are supported on the fixed plate. Each of the bellows has a pair of opposed open ends. A movable plate 44 is sealingly connected to one end of bellows 42. Two identical limiter pins 46 and 48 are fixed at one end of each pin to fixed plate 36. A head plate 50 is fixed to the other end of each of the limiter pins to hold the limitr pins parallel to each other. A connector rod 52 has one end fixed to movable plate 44. The connector rod extends slideably through fixed plate 36 and includes a connector eye 54 on one end which connector eye connects that end of the connector rod to ram 26.

Fixed plate 36 generally includes a flat circular body 56 with a pair of identical ears 58 and 60 formed integral with the outer periphery of circular body 56. Ears 58 and 60 include pin apertures 62 and 64 which receive fixedly limit pins 46 and 48, respectively. Body 56 includes an air inlet port 66 which receives an air inlet pipe 68. The air inlet pipe is connected to a conventional source of compressed air through a conventional regulator valve, none of which is shown herein. Body 56 includes a rod aperture 70 which is positioned in the center of the body. A bearing 72 is mounted in the rod aperture. A seal 74 is mounted in the bearing and is engageable with the connector rod 52 which is movably mounted in bearing 72. As is conventional, the seal forms an air seal between the bearing and the connector rod.

Movable plate 44 includes a flat circular body 76. Body 76 has a air of ears 78 and 80 formed integral with the outer periphery thereof so that the construction of body 76 is similar to that of fixed plate 36. Ears 78 and 80 include pin apertures formed therein which slideably receive limit pins 46 and 48, respectively, to limit movement of the movable plate to a substantially straight line movement parallel to the limit pins. Body 76 includes an aperture 82 formed in its center to receive fixedly connector rod 52.

Connector rod 52 includes a shaft portion 84 with a reduced mounting portion 86 on one end. The mounting portion is mateably received in aperture 82. A nut 88 is threadedly mounted on a threaded portion 90 of the connector rod to secure the connector rod to movable plate 44. The other end of the connector rod has a threaded portion 92. The mounting eye is threadedly mounted on threaded portion 92.

Head plate 50 includes a flat circular head plate body 94 with ears 96 and 98 formed integral with the outer periphery thereof similar to movable plate 44. Ears 96 and 98 include pin apertures which fixedly receive limit pins 46 and 48. The head plate holds limit pins 46 and 48 parallel to each other and parallel to connector rod 52. Body 94 of the head plate includes a nut recess 100 for receiving nut 88 which connects the connector rod to the movable plate. A bracket 102 with an opening 104 is fixed to head plate 50 to provide a means for securing the head plate and the fixed plate to frame 22. It is to be understood that the fixed plate may be secured to frame 22 by other conventional means.

A bellows connector 106 connects bellows 40 to bellows 42 and a bellows connector 108 connects the bellows 38 to bellows 40. The construction of each of the resilient pneumatic bellows is identical. Bellows 38 includes a lower bead 110 which is mounted in a fixed annular bead plate 112. Bellows 38 has a pair of girdle hoops 114 and 116 to retain the bellows. The upper end of bellows 38 includes an upper bead 118 which is sealingly mounted in bellows connector 108. Bellows 40 includes a lower bead 120 which is sealingly mounted in bellows connector 108.

Bellows connectors 106 and 108 are identical in construction. The construction of bellows connector 108 is shown in FIGS. 6, 7 and 8. Bellows connector 108 includes a generally flat ring body 122 with a pair of guide ears 124 and 126 formed integral with the outer periphery of the ring body. Guide apertures 128 and 130 are formed in guide ears 124 and 126, respectively. Guide bushings 132 and 134 are mounted in guide apertures 128 and 130, respectively. Guide bushings 132 and 134 are held in position by machine screws 136 and 138 which extend through one side of the bushings. Bushings 132 and 134 slideably receive limit pins 46 and 48, respectively. Fastener shoulders 140 and 142 are formed integral with the outer periphery of ring body 122. The fastener shoulders are diametrically opposed from each other and are spaced 90° from guide ears 124 and 126. The ring body is split diametrically forming two identical body halves 144 and 146. The split extends through the center of the body and through the center of the fastener shoulders. Conventional fasteners 148 and 150 are mounted in fastener shoulders 140 and 142 to hold the halves together. The ring body includes an internal seal 152.

Two annular bead plates 154 and 156 are mounted in internal seal 152. Bead plate 154 includes an annular bead receptacle 158 with an annular sealing plate 160 formed integral. An opening 162 is formed in the center of annular sealing plate 160. Bellows 38 has its upper bead 118 mounted in bead receptacle 158 and is sealingly positioned therein.

Annular bead plate 156 includes a bead receptacle 164 with an annular sealing plate 166 formed integral therewith. An opening 168 is formed in the center of the annular sealing plate 166, and opening 168 is aligned with opening 162. Bellows 40 has its lower bead 120 sealingly mounted in bead receptacle 164.

Annular sealing plate 166 includes an O-ring groove 170 with an O-ring 172 mounted therein. The O-ring is in sealing engagement with annular sealing plate 160 so that there is a seal between annular sealing plate 160 and annular sealing plate 166. Thus, the bellows connector provides a sealing connection between adjacent bellows 38 and 40.

Turning now to FIGS. 2 and 3, it may be seen that three identical limiters 174 are mounted on each of the limiter pins 46 and 48. Each of the limiters is sleeve-like and is in slideable engagement with its respective limit pins. Two of the limiters are positioned between the fixed plate and bellows connector 108. Two limiters are positioned between the bellows connectors 106 and 108, and the remaining two limiters are positioned between bellows connector 106 and movable plate 44. The limiters maintain the space between the plates and the connectors so that should there be a complete loss of air or collapse of the bellows for any reason, movable plate 44 would not crush the bellows.

Press 20 operates conventionally in that motor 30 turns shaft 28 which forces ram 26 downward. As the ram moves downward, an upper die portion 175 approaches a lower die portion 176 which lower die portion is mounted on bed 24. The air contained in counterbalance 34 is compressed as the ram pulls control rod 52 downward thereby moving the movable plate 44 downward toward the fixed plate. Upon completion of the downward stroke of ram 26, the continued rotation of the shaft starts to raise ram 26. The compressed air in the bellows of the counterbalance pulls the ram upward and holds the connection between the ram and the shaft to be the same relative connection as when the ram is moving downward so that there is a like relative engagement between the parts of the press when the ram is moving in a power stroke as well as in the return stroke. A minimum selected air pressure is maintained in the bellows by a conventional source of compressed air through a conventional regulator, neither of which are shown herein. In the event that there is any leakage of air from either counterbalance, the leaked air is replenished from the source of compressed air.

The utilization of three bellows in each of the counterbalances allows each counterbalance to have a long stroke. The specific construction of the counterbalance allows the bellows of the counterbalances to be quickly and easily mounted. In the event that there is a necessity to replace a bellows, it is a simple task to release the two pins and remove the movable plate and then a bellows connector. The specific construction of each bellows at each of the opposite open ends of the bellows allows the bellows to be quickly and easily removed and a new bellows quickly and easily placed in its stead. A bellows is simply removed from a bellows connector by releasing the two fasteners 148 and 150 thereby allowing the ring to be split and allow removal of the bellows with the annular bead plate. In order to replace a bellows, such as, bellows 40, bellows 40 is removed and another bellows with annular bead plates mounted on its ends is placed in the internal seal. The two fasteners 148 and 150 are reinserted, and the connector is clamped back onto the bellows to hold the bellows in place.

It may be seen how an increase in pressure within the bellows tends to force the bellows outward and thereby improve the seal between the end of the bellows and the bead receptacle. The lower end of bellows 38 is mounted in a bead receptacle of annular bead plate 112, which plate 112 is in turn sealingly connected to the fixed plate. The upper end of bellows 42 is sealingly connected in an annular bead plate 178 identical to bead plate 112 which plate 178 is sealingly connected to movable plate 44.

It may be appreciated that should any wear occur between bushings 132 and 134 and their respective limit pins, the bushings may be easily replaced to maintain a close alignment with the connector rod.

Although a specific construction of counterbalance 34 has been described in detail above, another form of counterbalance may be utilized instead of counterbalance 34. The other form of counterbalance is identified as counterbalances 200 and is shown in FIGS. 9 through 14.

Counterbalance 200 includes a fixed plate 202 which is fixedly connected to the frame 22 of the power press. Three resilient pneumatic bellows 204, 206 and 208 are supported on fixed plate 202. A bellows connector 210 connects one end of bellows 204 to one end of bellows 206. An identical second bellows connector 212 connects the other end of bellows 206 with bellows 208. A movable plate 214 is connected to the upper end of bellows 208. A pair of pins 216 and 218 is connected to fixed plate 202. A head plate 220 is fixed to the pins 216 and 218. Identical connector rods 222 and 224 are fixed to movable plate 214 at one end and at the other end the connector rods are connected to a crossbeam 226. The crossbeam has an extension connector rod 228 fixed to the center of the crossbeam and a mounting ear 230 is threadedly mounted on the end of the extension rod for connection to the ram of the power press.

Fixed plate 202 generally includes a circular body 232 with a pair of ears 234 and 236 formed integral with the outer periphery of the circular body. Each of the ears includes a pin aperture 238 to receive a respective limit pin. The fixed plate includes an air inlet aperture 240 with an air inlet pipe 242 mounted therein. The air inlet pipe is connected to a conventional source of compressed air through a conventional regulatory valve, neither of which is shown herein.

Movable plate 214 includes a flat circular body 244 having a pair of ears 246 and 248 formed integral with the outer periphery of body 244. The ears include pin apertures 250 which slideably receive limit pins 216 and 218. Movable plate 214 includes a pair of connector rod ears 252 which are identical to each other and are diametrically opposed from each other. The connector rod ears contain apertures and each receives connector rods 222 and 224, respectively. Identical nuts 254 are threaded on connector rods 222 and 224, respectively.

Head plate 220 includes a flat circular head plate body 256 with a pair of ears 258 and 260 formed integral with the outer periphery of the body. The head plate body includes a pair of nut apertures 262 to receive nuts 254 attached to the connector rods. A bracket 264 is fixed to the head plate body.

Three identical sleeve-like limiters 266 are slideably mounted on each of the limiter pins 216 and 218. A limiter mounted on each of the limit pins is positioned between the fixed plate and bellows connector 210. A limiter mounted on each of the limit pins is positioned between the two bellows connectors and a limiter mounted on each of the limit pins is positioned between bellows connector 212 and the movable plate.

The specific construction of bellows connector 210 is shown in FIGS. 13 and 14. Bellows connector 210 includes a ring body 268 having a pair of pin ears 270 and 272 formed integral with the outer periphery of the ring body. Pin aperture 274 is formed in ear 270 and a like pin aperture 276 is formed in ear 272. Bushings 278 and 280 are positioned in apertures 274 and 276, respectively. Machine screws 282 and 284 hold the bushings 278 and 280, respectively, in place. Limit pins 216 and 218 are slideably mounted in bushings 278 and 280, respectively.

Ring body 268 includes an internal seal, which internal seal includes an upper annular bead groove 286 and a lower annular bead groove 288. An annular disk 290 is formed integral with the interior of the ring body and is positioned between bead grooves 286 and 288. The annular disk includes an opening 292 in its center.

Bellows 204 which is identical to bellows 206 and 208 has opposed open ends and a pair of girdle hoops 294 and 296. As may be seen in FIGS. 13 and 14, bellows 204 has a bead 298 formed integral with its upper end, which bead is in sealing engagement with bead groove 288. The bellows also has an annular bellows lip 300 formed integral with the bead which is in sealing engagement with the underside of the annular disk. In like manner, bellows 206 has identical construction on its lower end in that it includes an annular bead 302 which is sealingly mounted in annular bead groove 286 and an annular bellows lip 304 formed integral with the bead. Lip 304 is in sealing engagement with the upper side of annular disk 290.

The construction of the lower end of bellows 204 is identical to the construction of the lower end of bellows 206. Fixed plate 202 includes a groove arrangement identical to the groove arrangement of the bellows connector so that the bottom of the bellows 204 is sealingly mounted in the fixed plate. Movable plate 214 has a groove arrangement identical to the lower portion of bellows connector 210. Plate 214 sealingly receives the upper portion of bellows 208 which has a bead and a lip arrangement identical to the upper end of bellows 204.

The operation of pneumatic counterbalance 200 is substantially identical to the operation of pneumatic counterbalance 34 disclosed in detail above. However, counterbalance 200 does not have a connector rod extending through the interior of the counterbalance. Movement of the ram compresses the air in the bellows. The air is compressed and as the ram returns, the compressed air pulls the ram up. The utilization of the two connector rods exteriorly of the bellows eliminates the need for a seal between the connector rod and the fixed plate.

The specific construction of the bellows provides a double seal arrangement in that the bellows lip is in sealing engagement with the annular disk and the bead in the bead groove provides an additional seal. As the pressure increases within the bellows, the bellows is placed into firm engagement with the connector to provide an improved seal.

As was mentioned hereinabove, the bushings may be changed to accommodate for wear. The limiters prevent the bellows from being crushed.

Although specific embodiments of the herein disclosed invention have been shown in the accompanying drawings and described in detail above, it is readily apparent that those skilled in the art may make various alterations and changes without departing from the spirit and scope of the present invention. It is to be expressly understood that the instant invention is limited only by the appended claims.

What is claimed is:

1. A pneumatic counterbalance for holding certain parts of a press in the same relative engagement during the return stroke of a ram of the press as during the power stroke of the ram comprising, in combination, a fixed plate connected to a part of the press, a resilient pneumatic bellows having opposed open ends, said pneumatic bellows having one end connected to the fixed plate, a movable plate connected to the opposite end of the pneumatic bellows, a connector rod connected to the movable plate and to another part of the press movable with that another part of the press, a plurality of elongated limit pins, each of said limit pins having one end secured to the fixed plate, and a bead plate connected to the other end of each of the limit pins cooperating with the fixed plate to hold the limit pins substantially parallel to each other, whereby movement of the movable plate toward the fixed plate compresses air within the pneumatic bellows and the compressed air urges the movable plate away from the fixed plate when the movable plate moves away from the fixed plate to hold certain parts of the press in the same relative engagement as during the movement of the movable plate toward the fixed plate, said movable plate being movably connected to each of the limit pins stabilizing movement of the movable plate thereby restricting the movement of the pneumatic bellows during compression and expansion of the pneumatic bellows to a substantially straight line movement substantially parallel to the limit pins.

2. A pneumatic counterbalance for holding certain parts of a press in the same relative engagement during the return stroke of a ram of the press as during the power stroke of the ram comprising, in combination, a fixed plate connected to a part of the press, a resilient pneumatic bellows having opposed open ends, said pneumatic bellows having one end connected to the fixed plate, a movable plate connected to the opposite end of the pneumatic bellows, a connector rod connected to the movable plate and to another part of the press movable with that another part of the press, the connector rod is slideably mounted in the fixed plate, and a plurality of limit pins parallel to the connector rod, each of said limit pins having one end fixed to the fixed plate, said movable plate being movably connected to the limit pins having the direction of movement limited by said limit pins, whereby movement of the movable plate toward the fixed plate compresses air within the pneumatic bellows and the compressed air urges the movable plate away from the fixed plate when the movable plate moves away from the fixed plate to hold certain parts of the press in the same relative engagement as during the movement of the movable plate toward the fixed plate.

3. A pneumatic counterbalance for holding certain parts of a press in the same relative engagement during the return stroke of a ram of the press as during the power stroke of the ram comprising, in combination, a fixed plate connected to a part of the press, a resilient pneumatic bellows having opposed open ends, said pneumatic bellows having one end connected to the fixed plate, a movable plate connected to the opposite end of the pneumatic bellows, a connector rod connected to the movable plate and to another part of the press movable with that another part of the press, the connector rod is slideably mounted in the fixed plate, a plurality of limit pins parallel to the connector rod, each of said limit pins having one end fixed to the fixed plate, said movable plate being connected to the limit pins limiting movement of the movable plate to a straight line substantially parallel to the connector rod, and a limiter connected to each of the limit pins and being positioned between the fixed plate and the movable plate to limit the minimum space between the movable plate and the fixed plate, whereby movement of the movable plate toward the fixed plate compresses air within the pneumatic bellows and the compressed air urges the movable plate away from the fixed plate when the movable plate moves away from the fixed plate to hold certain parts of the press in the same relative engagement as during the movement of the movable plate toward the fixed plate.

4. A pneumatic counterbalance for holding certain parts of a press in the same relative engagement during the return stroke of a ram of the press as during the power stroke of the ram comprising, in combination, a fixed plate connected to a part of the press, a resilient pneumatic bellows having opposed open ends, said pneumatic bellows having one end connected to the fixed plate, a movable plate connected to the opposite end of the pneumatic bellows, a connector rod connected to the movable plate and to another part of the press movable with that another part of the press, a second connector rod connected to the movable plate, and a crossbeam connected to said first mentioned connector rod and the second connector rod connecting the first mentioned connector rod and the second connector rod to said another part of the press movable with that another part of the press, whereby movement of the movable plate toward the fixed plate compresses air within the pneumatic bellows and the compressed air urges the movable plate away from the fixed plate when the movable plate moves away from the fixed plate to hold certain parts of the press in the same relative engagement as during the movement of the movable plate toward the fixed plate.

5. A pneumatic counterbalance for holding certain parts of a press in the same relative engagement during the return stroke of a ram of the press as during the power stroke of the ram comprising, in combination, a fixed plate connected to a part of the press, a resilient pneumatic bellows having opposed open ends, said pneumatic bellows having one end connected to the fixed plate, a movable plate connected to the opposite end of the pneumatic bellows, a connector rod connected to the movable plate and to another part of the press movable with that another part of the press, a second connector rod having one end connected to the movable plate, a crossbeam connected to the other end of said second connector rod and the first mentioned connector rod connecting the connector rods to said another part of the press movable with that another part of the press, a plurality of limit pins, said limit pins being fixed to the fixed plate, said movable plate being movably connected to the limit pins limiting movement of the movable plate, and limiters being positioned between the fixed plate and the movable plate to limit the minimum space between the movable plate and the fixed plate, whereby movement of the movable plate toward the fixed plate compresses air within the pneumatic bellows and the compressed air urges the movable plate away from the fixed plate when the movable plate moves away from the fixed plate to hold certain parts of the press in the same relative engagement as during the movement of the movable plate toward the fixed plate.

6. A pneumatic cushion for use in a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, a pair of diametrically opposed fastener shoulders formed integral with the ring body, said ring body being diametrically split through each of the fastener shoulders, a fastener mounted in each of the fastener shoulders holding the ring body together, a first annular bead plate mounted in the internal seal, said first annular bead plate having a first bead receptacle, said first resilient pneumatic bellows including a first bead sealingly mounted in the first bead receptacle of the first annular bead plate, said first annular bead plate having an annular sealing plate formed integral with the bead receptacle, a second annular bead plate mounted in the internal seal, said second annular bead plate having a second bead receptacle, said second annular pneumatic bellows having a second bead sealingly mounted in the second bead receptacle, said second annular bead plate having a second annular sealing plate formed integral with the second bead receptacle and connected to the first annular sealing plate, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

7. A pneumatic cushion for use in a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, a pair of diametrically opposed fastener shoulders formed integral with the ring body, said ring body being diametrically split through each of the fastener shoulders, a fastener connected to each of the fastener shoulders holding the split ring body together, a first annular bead plate mounted in the internal seal, said first annular bead plate having a first bead receptacle, said first resilient pneumatic bellows including a first bead sealingly mounted in the first bead receptacle of the first annular bead plate, said first annular bead plate having a first annular sealing plate formed integral with the bead receptacle, a second annular bead plate mounted in the internal seal, said second annular bead plate having a second bead receptacle, said second annular pneumatic bellows having a second bead sealingly mounted in the second bead receptacle, said second annular bead plate having a second annular sealing plate formed integral with the second bead receptacle and being positioned adjacent to the first annular sealing plate, and an O-ring positioned between the first annular sealing plate and the second annular sealing plate forming a seal therebetween, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

8. A pneumatic cushion for use in a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, a pair of limit pins connected to the fixed plate and to the movable plate, a pair of ears formed integral with the outer periphery of the ring body, each of the ears movably connected to a respective limit pin, a guide bushing mounted in each of the ears and being engageable with the respective limit pin, a limiter mounted on each of the limit pins between the ear and the fixed plate, a second limiter mounted on each of the limit pins between the ear and the movable plate, a pair of fastener shoulders formed integral with the ring body and being diametrically opposed from each other, said ring body being split on a diameter extending through the fastener shoulders, a fastener connected to each of the fastener shoulders holding the ring body together, a first annular bead plate mounted in the internal seal, said first annular bead plate having a first bead receptacle, said first resilient pneumatic bellows including a first bead sealingly mounted in the first bead receptacle of the first annulr bead plate, said first annular bead plate having an annular sealing plate formed integral with the bead receptacle, a second annular bead plate mounted in the internal seal adjacent to the first annular bead plate, said second annular bead plate having a second bead receptacle, said second resilient pneumatic bellows having a second bead sealingly mounted in the second bead receptacle, and said second annular bead plate having a second annular sealing plate cooperative with the first annular sealing plate, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

9. A pneumatic cushion for use in a press comprising, in combination, a fixed plate, a first resilient pneumaic bellows having a pair of opposed open ends, one end of the bellows sealingly connected to the fixed plate, a bellows connector, said bellows connector having an annular ring body, an internal seal in the ring body, said first resilient pneumaic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, a pair of parallel limit pins fixedly connected to the fixed plate, said limit pins being movably connected to the movable plate, a pair of ears formed integral with the outer periphery of the ring body and being movably connected to the limit pins, a guide bushing mounted in each of the ears and being movably engageable with the respective limit pin, a limiter movably mounted on each of the limit pins between the ear and the fixed plate, another limiter movably mounted on each of the limit pins between the ear and the movable plate, a pair of opposed fastener shoulders formed integral with the outer periphery of the ring body and being diametrically opposed from each other, said ring body being diametrically split through the fastener shoulders, a fastener connected to each of the fastener shoulders holding the split ring body together, a first annular bead plate mounted in the internal seal, said first annular bead plate having a first bead receptacle, said first resilient pneumatic bellows including a first bead sealingly mounted in the first bead receptacle of the first annular bead plate, said first annular bead plate having an annular sealing plate formed integral with the bead receptacle, a second annular bead plate mounted in the internal seal, said second resilient pneumatic bellows having a second bead sealingly mounted in the second bead receptacle, said second annular bead plate having a second annular sealing plate formed integral with the second bead receptacle and being positioned adjacent to the first annular sealing plate, and an O-ring positioned between the first annular sealing plate and the second annular sealing plate to form a seal therebetween, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

10. A pneumatic cushion for use in a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, and a movable plate sealingly connected to the other end of the second resilient pneumatic bellows, the internal seal includes an annular disk formed in the interior of the ring body, said internal seal including a first bead groove formed in the interior of the ring body adjacent to one side of the annular disk, said first resilient pneumatic bellows including a first bead sealingly mounted in the first bead groove, a second bead groove formed internally of the ring body adjacent to the other side of the annular disk, said second resilient pneumatic bellows having a second bead sealingly mounted in the second bead groove to form a seal therebetween, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

11. A pneumatic cushion for use on a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, the internal seal includes an annular disk formed in the interior of the ring body, said internal seal including a first bead groove formed in the interior of the ring body adjacent to one side of the annular disk, said first resilient pneumatic bellows including a first bead sealingly mounted in the first bead groove, said first resilient pneumatic bellows including a first bellows lip formed integral with the first bead and being sealingly engageable with one side of the annular disk, the internal seal including a second bead groove formed internally of the ring body adjacent to the other side of the annular disk, said second resilient bellows having a second bead sealingly mounted in the second bead groove to form a seal therebetween, and said second resilient pneumatic bellows including a second bellows lip sealingly engageable with the other side of the annular disk, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

12. A pnuematic cushion for use in a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, a pair of limit pins connected to the fixed plate and to the movable plate, a pair of ears formed integral with the outer periphery of the ring body and being movably connected to the limit pins, a guide bushing mounted in each of the ears and being movably engageable with the respective limit pin, a pair of limiters movably mounted on each of the limit pins, one of said limiters of each pair of limiters being positioned between the ear and the fixed plate, the other limiter of each pair of limiters being positioned between the ear and the movable plate, the internal seal including an annular disk formed integral with the interior of the ring body, said internal seal including a first bead groove formed in the interior of the ring body adjacent to one side of the annular disk, said first resilient pneumatic bellows including a first bead sealingly mounted in the first bead groove, said internal seal including a second bead groove formed in the interior of the ring body adjacent to the other side of the annular disk, and said second resilient pneumatic bellows having a second bead sealingly mounted in the second bead groove to form a seal therebetween, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

13. A pneumatic cushion for use in a press comprising, in combination, a fixed plate, a first resilient pneumatic bellows having a pair of opposed open ends, one end of the bellows sealingly connected to the fixed plate, a bellows connector, said bellows connector having an annular ring body, an internal seal in the ring body, said first resilient pneumatic bellows having its other end sealingly connected to the internal seal, a second resilient pneumatic bellows having a pair of opposed open ends, one end of the second bellows sealingly connected to the internal seal in unrestricted communication with the first resilient pneumatic bellows, a movable plate sealingly connected to the other end of the second resilient pneumatic bellows, a pair of limit pins connected to the fixed plate and to the movable plate, a pair of ears formed integral with the ring body, each of said ears being movably connected to a respective limit pin, a guide bushing mounted in each of the ears and being engageable with the respective limit pin, a pair of limiters movably mounted on each of the limit pins, one of said limiters of each of said pair of limiters being positioned between the ear and the fixed plate, the other limiter of each pair of limiters being positioned between the ear and the movable plate, the internal seal including an annular disk formed in the interior of the ring body and being substantially parallel to the ring body, said internal seal including a first bead groove formed in the interior of the ring body adjacent to one side of the annular disk, said first resilient pneumatic bellows including a first bead sealingly mounted in the first bead groove, said first resilient pneumatic bellows including a first bellows lip formed integral with the first bead and being sealingly engageable with one side of the annular disk, said internal seal including a second bead groove formed internally of the ring body adjacent to the other side of the annular disk, said second resilient bellows having a second bead sealingly mounted in the second bead groove to form a seal therebetween, and said second resilient pneumatic bellows including a second bellows lip sealingly engageable with the other side of the annular disk, whereby movement of the movable plate toward the fixed plate compresses air within the pneumatic bellows, said first resilient pneumatic bellows and the second resilient pneumatic bellows being interconnected in unrestricted communication thereby having substantially the same air pressure within each of the bellows and the compressed air within the bellows urges the movable plate away from the fixed plate.

14. A pneumatic counterbalance for holding certain parts of a press in the same relative engagement during the return stroke of a ram of the press as during the power stroke of the ram, comprising, in combination, a fixed plate connected to a part of a press, a movable plate, a plurality of interconnected resilient pneumatic bellows positioned between the fixed plate and the movable plate, and a connector rod having one end secured to the movable plate, said connector rod having its other end connected to another part of the press movable with that another part of the press, whereby movement of the movable plate toward the fixed plate compresses air within the plurality of interconnected pneumatic bellows and the compressed air urges the movable plate away from the fixed plate when the movable plate moves away from the fixed plate to hold certain parts of the press in the same relative engagement as during the movement of the movable plate toward the fixed plate.

15. A pneumatic counterbalance for holding certain parts of a press in the same relative engagement during the return stroke of a ram of the press as during the power stroke of the ram as defined in claim 14, including; a bellows connector sealingly connected to adjacent ends of adjacent pneumatic bellows for sealingly connecting the pneumatic bellows to each other.

16. A pneumatic counterbalance for holding certain parts of a press in the same relative engagement during the return stroke of a ram of the press as during the power stroke of the ram as defined in claim 14, including; a bellows connector sealingly connected to adjacent ends of adjacent pneumatic bellows for sealingly connecting the pneumatic bellows to each other, and a limiter positioned adjacent to each of the pneumatic bellows to control the minimum spacing for each pneumatic bellows between the respective bellows connector and another part.

17. A pneumatic counterbalance for holding certain parts of a press in the same relative engagement during the return stroke of a ram of the press as during the power stroke of the ram as defined in claim 14, including; a plurality of limit pins, each of said limit pins having one end fixed to the fixed plate, said movable plate being movably connected to each of the limit pins, and a limiter adjacent to each of the bellows to control the minimum space for each pneumatic bellows when the counterbalance is in its maximum compressed attitude.

18. A pneumatic counterbalance for holding certain parts of a press in the same relative engagement during the return stroke of a ram of the press as during the power stroke of the ram as defined in claim 14, wherein said connector rod is movably mounted in the fixed plate, and a seal is mounted in the fixed plate and engageable with the connector rod for sealing the space between the connector rod and the fixed plate.

19. A pneumatic counterbalance for holding certain parts of a press in the same relative engagement during the return stroke of a ram of the press as during the power stroke of the ram as defined in claim 14, including; a bellows connector sealingly connected to adjacent ends of adjacent pneumatic bellows for sealingly connecting the pneumatic bellows to each other, a plurality of limit pins connected to the fixed plate, said movable plate movably connected to the limit pins, and each bellows connector movably connected to the limit pins, whereby the limit pins limit movement of the movable plate and the bellows connector to a straight line movement parallel to the limit pins.

20. A pneumatic counterbalance for holding certain parts of a press in the same relative engagement during the return stroke of a ram of the press as during the power stroke of the ram as defined in claim 14, including; a plurality of limit pins connected to the fixed plate, said movable plate being movably connected to the limit pins for restricting movement of the movable plate to a straight line movement, a bellows connector sealingly connected to adjacent ends of adjacent pneumatic bellows for sealingly connecting the pneumatic bellows to each other, said bellows connector being movably connected to the limit pins for limiting movement of the bellows connector to a straight line movement, a head plate connected to the limit pins cooperating with the fixed plate to hold the limit pins substantially parallel to each other, and a limiter mounted on each limit pin adjacent to each bellows connector and the fixed plate to define the minimum space between the movable plate and the fixed plate to accommodate the pneumatic bellows.

21. A pneumatic counterbalance for holding certain parts of a press in the same relative engagement during the return stroke of a ram of the press as during the power stroke of the ram as defined in claim 14, including; a second connector rod connected to the movable plate, and a crossbeam connected to said first mentioned connector rod and the second connector rod for connecting the first mentioned connector rod and the second connector rod to said another part of the press movable with that another part of the press.

22. A pneumatic counterbalance for holding certain parts of a press in the same relative engagement during the return stroke of a ram of the press as during the power stroke of the ram as defined in claim 14, including; a plurality of limit pins connected to the fixed plate and movably connected to the movable plate for limiting movement of the movable plate to a straight line movement of the movable plate, a second connector rod connected to the movable plate, and a crossbeam connected to the first mentioned connector rod and the second connector rod for connecting the first mentioned connector rod with the second connector rod to said another part of the press movable with that another part of the press.

23. A pneumatic counterbalance for holding certain parts of a press in the same relative engagement during the return stroke of a ram of the press as during the power stroke of the ram as defined in claim 14, including; a second connector rod connected to the movable plate, a crossbeam connected to the first mentioned connector rod and the second connector rod for connecting the first mentioned connector rod and the second connector rod to said another part of the press, a plurality of limit pins connected to the fixed plate and movably connected to the movable plate for stabilizing movement of the movable plate to a straight line movement of the movable plate, a head plate connected to the limit pins cooperating with the fixed plate to hold the limit pins substantially parallel to each other, a bellows connector sealingly connected to adjacent ends of adjacent pneumatic bellows for sealingly connecting the pneumatic bellows to each other, and a limiter mounted on each of the limit pins adjacent to each bellows connector and to the fixed plate to control the minimum spacing between the fixed plate and the movable plate, said bellows connector being movably connected to the limit pins for limiting movement of the bellows connector to a straight line movement.

24. A pneumatic counterbalance for holding certain parts of a press in the same relative engagement during the return stroke of a ram of the press as during the power stroke of the ram as defined in claim 14, including; a pair of parallel limit pins, each of said limit pins having one end fixedly connected to the fixed plate, said movable plate being movably connected to the limit pins, said plurality of resilient pneumatic bellows including a first resilient pneumatic bellows having a pair of opposed open ends, one end of the first bellows sealingly connected to the fixed plate, a bellows connector, said bellows connector having an annular ring body, a pair of first connector ears formed integral with the outer periphery of the ring body, a guide bushing mounted in each of the ears and being movably engageable with a respective limit pin, a pair of opposed fastener shoulders formed integral with the outer periphery of the ring body and being diametrically opposed from each other, said ring body being diametrically split through the fastener shoulders, a fastener connected to each of the fastener shoulders holding the split ring body together, an internal seal in the ring body, a first annular bead plate mounted in the internal seal, said first annular bead plate having a first bead receptacle, said first resilient pneumatic bellows including a first bead on the other end, said first bead sealingly mounted in the first bead receptacle of the first annular bead plate, said first annular bead plate having an annular sealing plate formed integral with the first bead plate, a limiter mounted on each of the limit pins between the ear and the fixed plate, a second annular bead plate mounted in the internal seal, said second annular bead plate having a second bead receptacle, said plurality of resilient pneumatic bellows including a second resilient pneumatic bellows having a pair of opposed open ends, said second resilient pneumatic bellows having a second bead formed on one end, said second bead sealingly mounted in the second bead receptacle, said second annular bead plate having a second annular sealing plate formed integral with the second bead receptacle and being positioned adjacent to the first annular sealing plate, an O-ring positioned between the first annular sealing plate and the second annular sealing plate to form a seal therebetween, a second bellows connector, said second bellows connector having a second annular ring body, a second internal seal in the second ring body, a third annular bead plate mounted in the second internal seal, said third annular bead plate having a third bead receptacle, said second resilient pneumatic bellows including a third bead sealingly mounted in the third bead receptacle of the third annular bead plate, said third annular bead plate having a third annular sealing plate formed integral with the third bead receptacle, a fourth annular bead plate mounted in the second internal seal, said fourth annular bead plate having a fourth bead receptacle, said plurality of resilient pneumatic bellows including a third resilient pneumatic bellows having a pair of opposed open ends, said third resilient pneumatic bellows having a fourth bead in one end, said fourth bead sealingly mounted in the fourth bead receptacle, said fourth annular bead plate having a fourth annular sealing plate formed integral with the fourth bead receptacle and being positioned adjacent to the third annular sealing plate, a second O-ring positioned between the third annular sealing plate and the fourth annular sealing plate to form a seal therebetween, a pair of second ears formed integral with the outer periphery of the ring body of the second bellows connector, a second guide bushing mounted in each of the second ears and being movably engageable with a respective limit pin, a second limiter movably mounted on each of the limit pins between the ears of the first mentioned bellows connector and the second ears of the second bellows connector, said third resilient pneumatic bellows having its other end sealingly fixed to the movable plate, and a third limiter mounted on each of the limit pins between the second ear of the second bellows connector and the movable plate.

25. A pneumatic counterbalance for holding certain parts of a press in the same relative engagement during the return stroke of a ram of the press as during the power stroke of the ram as defined in claim 14, including; a pair of limit pins, each of said limit pins having one end fixed to the fixed plate, said movable plate being movably connected to the limit pins, said plurality of resilient pneumatic bellows including a first resilient pneumatic bellows having a pair of opposed open ends, one end of the bellows sealingly connected to the fixed plate, a bellows connector, said bellows connector having an annular ring body, a pair of ears formed integral with the outer periphery of the ring body, a guide bushing mounted in each of the ears and being movably engageable with a respective limit pin, a limiter mounted on each limit pin between the fixed plate and each ear of the bellows connector, said annular ring body having an annular internal seal, the internal seal including an annular disk formed in the interior of the ring body and being substantially parallel to the ring body, said internal seal including a first annular bead groove formed in the interior of the ring body adjacent to one side of the annular disk, said first resilient pneumatic bellows including a first annular bead formed integral on one end, said first bead sealingly mounted in the first bead groove, said first resilient pneumatic bellows including a first annular bellows lip formed integral with the first bead and being sealingly engageable with one side of the annular disk, said internal seal including a second annular bead groove formed internally of the ring body adjacent to the other side of the annular disk, said plurality of resilient pneumatic bellows including a second resilient pneumatic bellows having a pair of opposed open ends, said second resilient pneumatic bellows including a second annular bead formed integral with one end thereof, said second bead sealingly mounted in the second bead groove to form a seal therebetween, said second resilient pneumatic bellows including a second annular bellows lip sealingly engageable with the other side of the annular disk, a second bellows connector, said second bellows connector having a second annular ring body, sid second annular ring body having a second internal seal, the second internal seal including a second annular disk formed in the interior of the second ring body and being substantially parallel to the second ring body, said second internal seal including a third annular bead groove formed in the interior of the second ring body adjacent to one side of the second annular disk, said second resilient pneumatic bellows including a third annular bead on the other end, said third bead sealingly mounted in the third bead groove, said second resilient pneumatic bellows including a third annular bellows lip formed integral with the third bead and being sealingly engageable with one side of the second annular disk, said second internal seal including a fourth annular bead groove formed internally of the second ring body adjacent to the other side of the second annular disk, said plurality of pneumatic bellows including a third resilient pneumatic bellows having a pair of opposed open ends, said third resilient pneumatic bellows having a fourth annular bead formed integral with one end thereof, said fourth annular bead sealingly mounted in the fourth bead groove to form a seal therebetween, said third resilient pneumatic bellows including a fourth annular bellows lip formed integral with the fourth bead, said fourth bellows lip sealingly engageable with the other side of the second annular disk, said third resilient pneumatic bellows having its other end sealingly connected to the movable plate, said second bellows connector having a pair of second ears, a second guide bushing mounted in each of the second ears and being engageable with a respective limit pin, a second limiter mounted on each of the limit pins between the ears of the first mentioned bellows connector and the second ears of the second bellows connector, and a third limiter mounted on each of the limit pins between the second ears of the second bellows connector and the movable plate.

26. A pneumatic cushion for use in a press comprising, in combination, a fixed plate, a first resilient pneumatic bellows having a pair of opposed open ends, one end of the bellows sealingly connected to the fixed plate, a bellows connector sealingly connected to the other end of the bellows, a second resilient pneumatic bellows having a pair of open ends, one end of the second bellows sealingly connected to the bellows connector in unrestricted communication with the first bellows, a movable plate sealingly connected to the other end of the second bellows, and a plurality of elongated limiter pins each being connected to the fixed plate and the movable plate, all of said limiter pins being in sliding engagement with said bellows connector.

27. A pneumatic cushion for use in a press as defined in claim 26, including a plurality of limiters between the fixed plate and the bellows connector to space the bellows connector a selected minimum distance from the fixed plate when the bellows connector moves toward the fixed plate.

28. A pneumatic cushion for use in a press as defined in claim 26, including a plurality of limiters between the movable plate and the bellows connector to space a minimum distance between the movable plate and the bellows connector when there is relative movement of the movable plate and the bellows connector toward each other.

29. A pneumatic cushion for use in a press as defined in claim 26, including a plurality of limiters between the fixed plate and the bellows connector to space a minimum distance between the bellows connector and the fixed plate, and a second plurality of second limiters between the movable plate and the bellows connector to space a minimum distance between the movable plate and the bellows connector.

30. A pneumatic cushion for use in a press as defined in claim 26, wherein the other end of the first mentioned bellows is sealingly connected to one side of the bellows connector, said one end of the second bellows being sealingly connected to a side opposite to the one side of the bellows connector, and including a limiter mounted on each of the limiter pins between the fixed plate and the bellows connector to space a minimum distance between the bellows connector and the fixed plate, and a second limiter mounted on each of the limiter pins between the movable plate and the bellows connector to space a minimum distance between the movable plate and the bellows connector.

* * * * *

UNITED STATES PATENT AND TRADEMARK OFFICE
CERTIFICATE OF CORRECTION

PATENT NO. : 4,825,681

DATED : May 2, 1989

INVENTOR(S) : Kenneth L. Smedberg, et al.

It is certified that error appears in the above-identified patent and that said Letters Patent is hereby corrected as shown below:

Col. 3, Line 28, cancel "limitr" and substitute therefor --limiter--.

Col. 3, Line 50, cancel "air" and substitute therefor --pair--.

Claim 8, Col. 11, Line 35, cancel "annulr" and substitute therefor --annular--.

Claim 9, Col. 11, Line 54, cancel "pneumaic" and substitute therefor --pneumatic--.

Claim 9, Col. 11, Line 59, cancel "pneumaic" and substitute therefor --pneumatic--.

Claim 9, Col. 12, Line 21, after "seal," insert --said second annular bead plate having a second bead receptacle,--

Signed and Sealed this

Twenty-eighth Day of August, 1990

Attest:

HARRY F. MANBECK, JR.

*Attesting Officer*          *Commissioner of Patents and Trademarks*